March 16, 1954
R. H. STANTON
2,672,365
DRAINAGE MEMBER FOR VENTILATING WINDOWS OF MOTOR VEHICLES
Filed Aug. 9, 1949
2 Sheets-Sheet 1
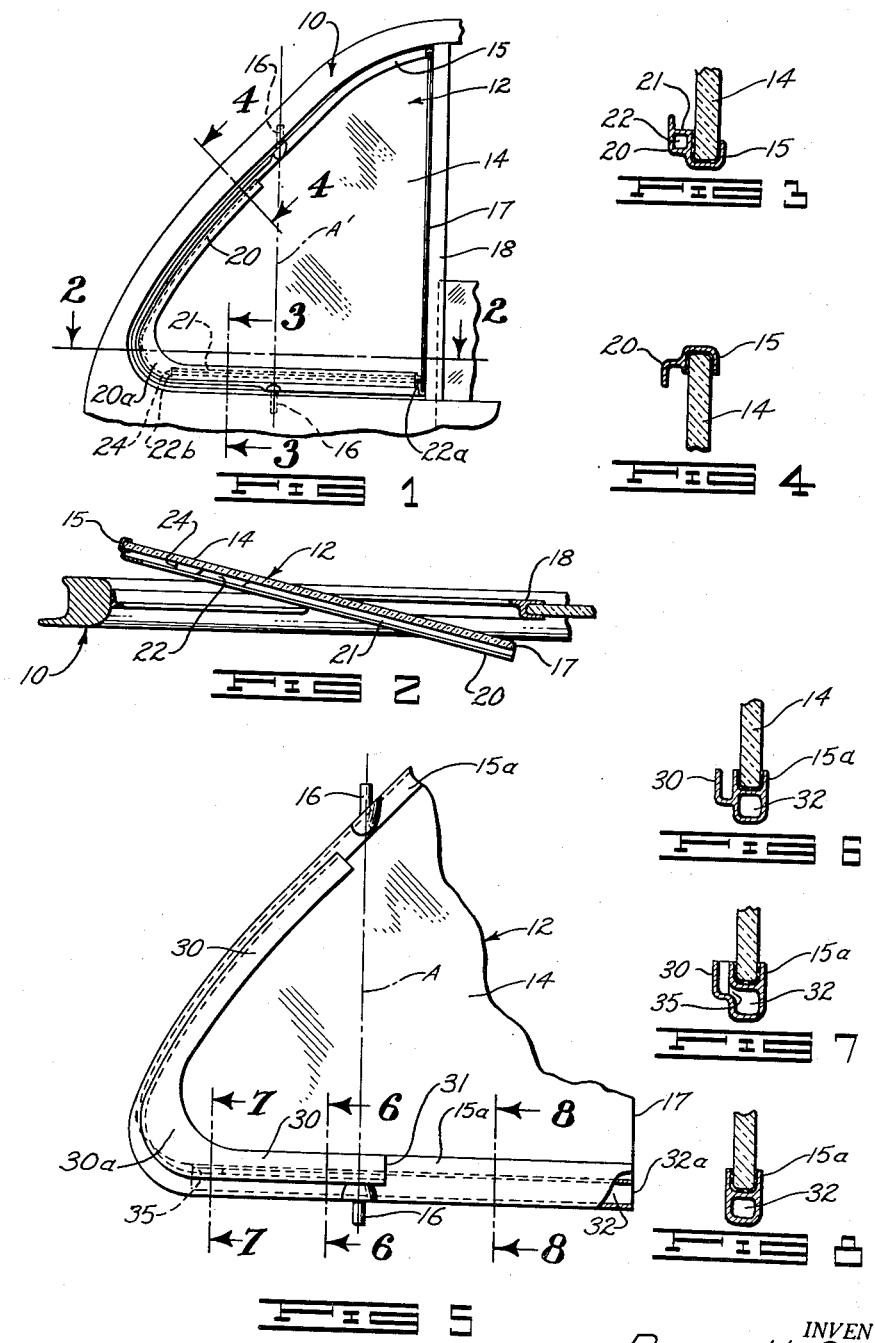
INVENTOR.
ROBERT H. STANTON
BY
ATTORNEYS March 16, 1954
R. H. STANTON
2,672,365
DRAINAGE MEMBER FOR VENTILATING
WINDOWS OF MOTOR VEHICLES
Filed Aug. 9, 1949
2 Sheets-Sheet 2
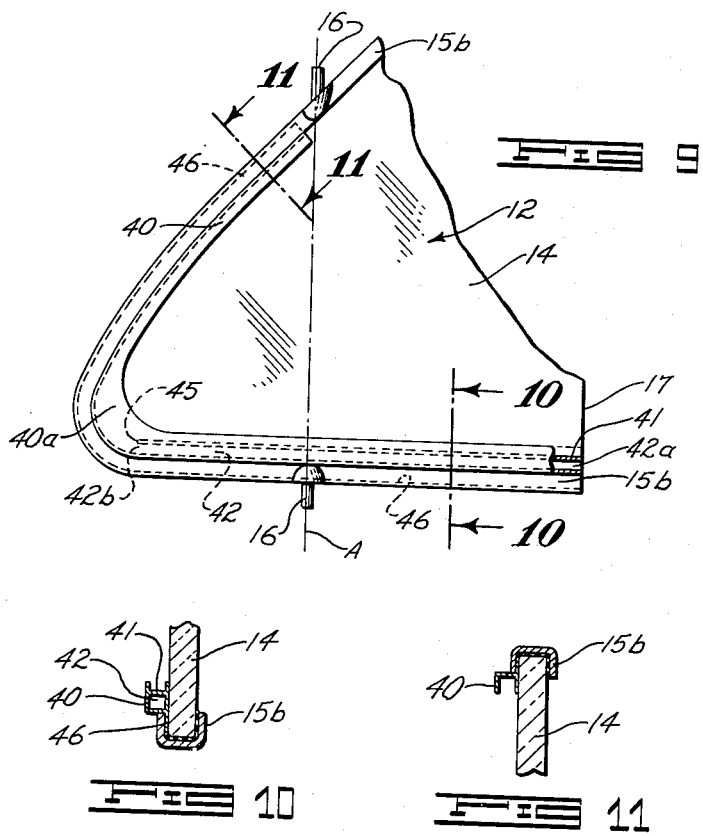
INVENTOR.
ROBERT H. STANTON
BY
ATTORNEYS Patented Mar. 16, 1954

2,672,365

UNITED STATES PATENT OFFICE 2,672,365

DRAINAGE MEMBER FOR VENTILATING WINDOWS OF MOTOR VEHICLES

Robert H. Stanton, San Marino, Calif.

Application August 9, 1949, Serial No. 109,314

8 Claims. (Cl. 296—44)

The present invention is generally concerned with improvements in the so-called ventilating windows of motor vehicles, and more particularly with a drainage member for such a window adapted to collect rain, dust, or other foreign matter and conduct it to a discharge point outside the car in order to prevent its dropping off the window into the interior of the vehicle. This drainage member may be either incorporated into the window frame as an integral part thereof, or it may be added to an already manufactured window as an attachment.

It is now quite common practice to equip automobiles, and other vehicles, with ventilating windows of the so-called "no-draft" type of window which is adapted to pivot about an upwardly extending axis. These windows are in addition to the ordinary windows which raise and lower, and have as their object production of air currents which ventilate the interior of the vehicle without subjecting the occupants thereof to any strong air currents or direct draft. Ventilating windows of this type have pivotal mountings on their bottom and forward or upper edges, two pivots being aligned to provide a single axis of rotation which is usually substantially vertical, but which may be somewhat inclined. When rotated about this axis to a ventilating position, the forward portion of the window ahead of the pivotal axis extends into the vehicle, while the portion rearwardly of the axis projects outwardly of the vehicle body into the air stream moving over the body as the vehicle moves forwardly. By regulating the degree of rotation of the window, air circulation within the vehicle of different degrees of strength may be obtained without obtaining a strong draft of air comparable to that resulting from deflecting the external air stream directly into the automobile.

Although a window of this design may be satisfactory for producing an air draft within the vehicle, the window has a disadvantage in that it introduces into the interior of the vehicle foreign matter such as dust, rain, insects and the like which come into contact with the outside surface of the ventilating window. The portion of the window rearwardly of the pivot as determined by the direction of vehicle movement extends outwardly and rearwardly, and air striking against this portion of the window is generally deflected outwardly. This air passes off the rear or trailing edge of the ventilating window with a rather strong draft. However, there are certain subsidiary or eddy currents set up by this air stream which move forwardly and inwardly over the surface of that portion of the window which lies ahead of the pivotal axis of the window. These latter currents cause a portion of the rain striking the window to move forwardly over the window until the accumulated water runs off the lower edge and drips into the vehicle. The water so introduced into the car may wet and stain the upholstery of the car, or more objectionally it may drip upon the clothing of the occupants causing damage thereto and very considerable annoyance to the ocupants of the vehicle. Although solid particles, such as dust or insects, do not particularly adhere to the surface of the window and drip off the lower edge, they are also carried by the secondary air currents along the surface of the ventilating window and into the interior of the vehicle.

Various gutter arrangements have been devised to cope with this situation. While they may be successful in collecting rain or the like, yet they are generally subject to a shortcoming in that they fail to properly discharge the collected material at a point outside the vehicle. These prior art devices may generally be characterized as gravity flow devices in which the force of gravity is relied upon to carry the collected material to the point of discharge. If wind currents or the inclination of the car are such as to oppose and overcome the force of gravity, then the collected material is not properly discharged and may overflow from the collecting gutter into the interior of the vehicle.

Thus it becomes the general object of my invention to provide a drainage device for a ventilating window adapted to carry rain or other material to a point of discharge outside the vehicle.

It is a further object of my invention to provide a device in which the force of gravity alone is not relied upon to attain positive and effective discharge of collected material.

It is a further object of my invention to provide a drainage device which is simple and economical to construct and which may be incorporated into the frame of the ventilator windows in order to give a neat trim appearance, or it may be made as an attachment for ventilator windows of automobiles now in use.

These objects have been attained according to my invention by providing a drainage member for the pivotally mounted ventilating window of a motor vehicle, said drainage member providing an enclosed duct along the bottom edge of the window which opens at its rear end near the trailing edge of the window and opens at its front end at a position forwardly of the pivotal axis about which the window swings and near the forward edge of the window itself.

I also combine with the duct and the drainage member an open gutter which extends along the edge of the window, including a part or substantially all of the window forwardly of the pivotal axis and also along the bottom edge of the window to a point adjacent the pivotal axis and preferably to a position rearwardly of the pivotal axis. Thus the duct and gutter overlap in part and the duct opens at its forward end to the gutter. The gutter serves to collect rain or other material carried by air current over the surface of the window and to discharge this material into the duct which then carries the material to a discharge point at or near the trailing edge of the window which is always disposed outwardly from the side of the vehicle.

How the above and other objects of my invention, including those not specifically referred to herein, are attained will be more readily understood by reference to the following description and to the annexed drawings, in which:

Fig. 1 is a fragmentary side elevation of a vehicle showing in elevation a pivotally mounted ventilating window with a drainage member constructed according to my invention;

Fig. 2 is a fragmentary horizontal section on line 2—2 of Fig. 1;

Fig. 3 is a fragmentary vertical section through the edge of the window and drainage member on line 3—3 of Fig. 1;

Fig. 4 is a fragmentary inclined section through the edge of the window and the drainage member on line 4—4 of Fig. 1;

Fig. 5 is a fragmentary side elevation of a ventilating window showing a modified form of my invention;

Fig. 6 is a fragmentary vertical section through the edge of the ventilating window and drainage member on line 6—6 of Fig. 5;

Fig. 7 is a similar view on line 7—7 of Fig. 5;

Fig. 8 is a similar section on line 8—8 of Fig. 5;

Fig. 9 is a fragmentary side elevation of a ventilating window with a modified form of my invention attached thereto;

Fig. 10 is a vertical section on line 10—10 of Fig. 9 showing the edge of the ventilating window and the attached drainage member in section; and Fig. 11 is an inclined section on line 11—11 of Fig. 9 showing the edge of the window and the attached drainage member.

Referring now to the drawings, there is shown in Figs. 1 to 4 a preferred embodiment of my invention. There is generally indicated at 10 the door in an automobile body as being typical of the vehicle body, or portion thereof, in which the ventilating windows may be mounted. The ventilating window is indicated generally at 12 and consists of a pane of glass 14 mounted in a channel-shaped metal frame 15. Frame 15 is provided with upper and lower pivots 16 which define an upwardly extending pivotal axis A about which the ventilating window swings with respect to car door 10. The axis defined by pivots 16 is usually vertical, or substantially so; but sometimes the axis is inclined an appreciable amount to the vertical. Of course, it will be understood that my invention is in no way limited to a particular location or direction of this axis of pivotal movement.

Window 12 is typically roughly triangular in shape. The rear or trailing edge 17 is normally straight and not engaged by frame 15, but when the window is in the closed position the margin of the window adjacent rear edge 17 engages meeting rail 18 which forms a part of a stationary frame fastened to the vehicle body and which cooperates with movable frame 15 to provide a weather tight seal around the edge of the ventilating window.

Like trailing edge 17, the bottom edge of the window is usually straight, while the third side of the window is the forward side normally inclined as shown. As may be seen from Fig. 2, window 12 is rotated clockwise, when viewed from above, in order to move it to the open position. This results in moving the front end of the window, that is the portion of the window lying forwardly of axis A defined by pivots 16, inwardly of the car body. Likewise, the rear end of the window, that is the portion lying rearwardly of axis A, is moved outwardly from the car body. The distance the window extends in or out depends, of course, upon the amount of angular rotation of the window.

The drainage member constituting the present invention is formed integrally with metal window frame 15, and comprises an angular wall 20 which starts at a point slightly forward of and below upper pivot 16 and proceeds continuously around the edge of window 12 down the forward side and along the bottom side to terminate at trailing edge 17, as shown in Fig. 1. Angular wall 20 has horizontal and vertical legs of a size suitable to catch any rain water or dust and prevent them from being carried past the ventilating window and into the vehicle. As clearly shown in Figs. 3 and 4, wall 20 forms a gutter which is secured to the frame 15 and is open at one side adjacent pane 14.

Along the bottom side of the window, the vertical leg of wall 20 is made longer and a horizontal web 21 is added, as shown in detail in Fig. 3. The result is to form in the lower portion of the drainage member below the gutter an enclosed duct 22 which is secured to the frame 15. In Fig. 2 a portion of the wall 21 is shown broken away to show the duct 22 beneath it. The duct extends substantially the entire length of the bottom edge of window 12, and opens at its rear end 22a at trailing edge 17 of the window where the drainage member terminates. The opening 22a faces rearwardly of the window. Web 21 extends from trailing edge 17 forwardly of pivots 16 to terminate at some point 24 which is near the forward edge of the ventilating window, where the duct 22 opens at its front end 22b into the open gutter formed by wall 20. Generally speaking, it is desirable that this wall be carried as far forwardly in the ventilating window as possible since this end of the wall determines the location of the forward opening 22b of the duct; but for practical reasons the wall is here shown as ending at the forward end of the straight section along the bottom side of the window where the curved transition to the forward inclined side begins. If the wall curves upwardly, water in the gutter to the rear of the end 24 does not flow readily into the front end 22b of the duct.

As explained above, when window 12 is open, the outside surface is struck by various substances of which rain is typical and the one of principal concern, as the vehicle moves forwardly. The back end of the window projects into the strong current of air moving around the vehicle and the rain or other material is in part blown off the ventilating window at the trailing edge. The remainder of the rain is carried forwardly over the surface of the window by secondary air currents which enter the car between the car body and the front side of the window. This rain is caught in gutter 20 and flows downwardly in the gutter, under the combined action of air currents and gravity. Thus the forward portion of the gutter acts primarily to collect rain as the air currents blow it over the surface of the window. The portion of the gutter along the lower edge of the window also collects the rain which runs down the window.

However, the rain collected at the forward end of the window enters the open forward end 22b of duct 22 and is carried through the duct and discharged therefrom at its rear end. The air currents passing inwardly over the forward portion of the window past the forward and lower edges thereof create a zone of relatively higher pressure at the forward end of the duct which facilitates entry of rain into the duct at this end. The gutter acts as a pocket to promote the production of a relatively high pressure at the forward open end of the duct. For this reason the gutter wall may be made higher at the angle of the window, as shown at 20a, to form a better pocket to catch the air current. The increased depth of the gutter at this position also increases the capacity for collection of water. As is well-known, the outside air stream passing off the window at the rear edge causes a zone of comparatively lower pressure at the rear edge of the window, and it is this condition which draws air out of the interior of the vehicle through the gap between the trailing edge of the window and meeting rail 18. This condition of lowered air pressure is best applied to the rear end of the duct by facing rearwardly the open end 22a. This zone of lowered air pressure is utilized in the present invention to facilitate discharge of rain from the open end of duct 22. With the construction described, there is a differential of air pressure between the forward and rearward ends of the duct which is utilized to facilitate flow of water through the duct and discharge from the rear end thereof. The amount of this differential air pressure depends upon a number of factors, such as the velocity of the vehicle, the extent to which the window is open, wind conditions outside the vehicle, and the like.

In the event that dirt collects in duct 22, the duct may be cleaned by a flexible wire or cleaner similar to a pipe cleaner, or it may be blown out by compressed air.

Figs. 5 to 8 illustrate a modified form of my invention in which, as before, the drainage member is formed integrally with the metal frame 15a which holds glass pane 14, and comprises an open gutter and an enclosed duct secured to the frame. In this form of the invention, the open gutter is formed by an angular wall 30 which starts from a point slightly forward of and below upper pivot 16 and continues along the forward edge of the window, and along the bottom edge to a point adjacent and rearwardly of pivot 16. The gutter forming wall 30 is preferably of increased height at the forward angle of the window, as indicated at 30a, for reasons mentioned above. Thus water discharged from the end of the gutter is discharged at a point 31 outside the car body, but the gutter does not continue along the bottom edge to trailing edge 17 as in Fig. 1. As in the form previously described, wall 30 is an angular member so that the gutter is open along one side adjacent pane 14 for its entire length.

A change has been made in the location of the enclosed duct indicated at 32 in Figs. 6, 7, and 8. Instead of lying at one side of glass pane 14, the enclosed duct is formed in the window frame 15 in such a manner that the duct lies below and in the prolongation of glass pane 14. Hence, the window frame at the margin has the same thickness as it would without the duct. The gutter formed by wall 30 and the duct 22 overlap for a portion of their length, since the duct extends along substantially the entire bottom edge of the window, from a point near the forward edge of the ventilator window to the trailing edge 17. At the forward end of the duct, an opening is provided at 35 in the side wall of duct 32, shown in detail in Fig. 7, whereby water collected in the gutter 30 can pass downwardly into the front end of duct 32 and also higher air pressure can be applied to the forward end of the duct. Water flows through the duct and is discharged at the back end 32a at the trailing edge 17 of the window where the duct opens into a zone of relatively low pressure, as previously described. Thus, a differential air pressure is maintained between the ends of the enclosed duct which facilitates flow of water through the duct and discharge at the rear end thereof.

Figs. 9 to 11 illustrate another modification of my invention which is distinguished from the form first above described primarily in that the drainage member is made as a fixture to be attached to a window of an automobile already in use, rather than being incorporated in the window at the time of manufacture because it is formed integrally with the window frame.

The attachment is preferably made of sheet metal, but may be made of any other suitable material. It comprises an angular wall 40 which starts from a point slightly forward of and below upper pivot 16 and continues downwardly along the forward edge of the window and then rearwardly along the bottom edge of the window to a point at or near trailing edge 17, preferably having a portion 40a of increased height at the forward angle of the window. The forward portion of the drainage member consists simply of the open gutter provided by channel 40, the gutter being open along one side adjacent glass 14 to receive and collect rain from the window pane. Along the bottom portion of the drainage member, the vertical side of channel 40 is made higher and there is added a horizontal web 41 which subdivides the drainage member into two portions as shown in Fig. 10. The upper portion is the open gutter and the lower portion is the enclosed duct indicated at 42, which extends substantially the entire length of the bottom edge of the window 12. Web 41 extends forwardly from the trailing edge of the window to a point 45 near the forward edge of the window; and it is at this point that duct 42 opens at 42b to the gutter. The rear open end of the duct at 42a is located at or near the trailing edge 17 of the window, and is rearwardly disposed in order to make effective use of the relatively lower air pressure at the rear end of the duct. The open gutter defined by channel 40 above the web 41 also terminates at the trailing edge of the window, the rear end portion of the outer side wall of said channel being broken away in Fig. 10 to show the duct 42 and the open gutter behind said wall.

As a means for attaching the drainage member to the window, there is provided an outwardly extending flange 46 which is formed integrally with the drainage member. Flange 46 is relatively thin so that it can be inserted between glass pane 14 and the upwardly turned side of the frame channel 15b which latter is the conventional type of frame for pivotally mounting the ventilating window in the car body.

It will be appreciated that this type of drainage member operates in the manner previously described since the forward end of the duct at 45 is in a zone of relatively higher air pressure where it can receive rain collected in the gutter along the forward end of the window. The discharge end of the duct is in a zone of relatively lower air pressure so that the differential in air pressure is utilized to effect flow of water through the duct and discharge at the rear end.

It will be obvious without illustration, that the embodiment of the drainage member in an attachment for a window may be modified as shown in Fig. 5 to terminate the gutter forwardly of the trailing edge of the window but rearwardly of lower pivot 16.

From the foregoing description of typical embodiments of my invention, it will be apparent that various changes in construction will occur to persons skilled in the art without departing from the spirit and scope of my invention. Consequently, I wish it understood that the foregoing is considered as being illustrative of, rather than restrictive upon, the appended claims.

I claim:

1. The combination of: a motor vehicle window mounted to swing about an upwardly extending pivotal axis; and a drainage member along the bottom edge of the window; said drainage member comprising an enclosed duct extending substantially the entire length of said bottom edge of the window, and an open gutter extending rearwardly from the forward edge of the window to a point rearwardly of said pivotal axis; said enclosed duct opening at its front end to the gutter at a position forwardly of said pivotal axis and near the forward edge of the window, and opening at its rear end near the trailing edge of the window.

2. The combination of: a motor vehicle ventilating window pivotally mounted to swing about an upwardly extending pivotal axis; an open gutter extending along substantially the entire length of the forward and bottom edges of the window forwardly of said pivotal axis, and rearwardly along the bottom edge of the window to a position rearwardly of said axis; and an enclosed duct extending along substantially the entire length of said bottom edge of the window, opening at its front end to the gutter at a position forwardly of said axis and near the forward edge of the window, and opening at its rear end near the trailing edge of the window.

3. The combination as in claim 2, in which said open gutter extends along substantially the entire length of the bottom edge of the window.

4. A frame for a motor vehicle ventilating window comprising a frame body adapted to hold and mount the ventilating window to swing about an upwardly extending pivotal axis; an open gutter secured to the frame body in position to extend along substantially the entire length of the forward and bottom edges of the window forwardly of said pivotal axis, and rearwardly along the bottom edge of the window to a position rearwardly of said axis; and an enclosed duct secured to said frame body in position to extend along substantially the entire length of said bottom edge of the window, opening at its front end to the gutter at a position forwardly of said axis and near the forward edge of the window, and openings at its rear end near the trailing edge of the window.

5. A frame as set forth in claim 4, in which said open gutter extends along substantially the entire length of the bottom edge of the window.

6. A drainage member for a motor vehicle ventilating window adapted to swing about an upwardly extending pivotal axis, said drainage member comprising: an enclosed duct formed to extend along substantially the entire length of the bottom edge of the window; and an open gutter integral with said enclosed duct and formed to extend rearwardly along said bottom edge of the window, from the forward edge of the window to a point rearwardly of said pivotal axis; said enclosed duct opening at its front end to the gutter at a position forwardly of said pivotal axis and near the forward edge of the window, and opening at its rear end near the trailing edge of the window.

7. A drainage member for a motor vehicle ventilating window adapted to swing about an upwardly extending pivotal axis, said drainage member comprising: an open gutter formed to extend along substantially the entire length of the forward and bottom edges of the window forwardly of said pivotal axis, and rearwardly along the bottom edge of the window to a position rearwardly of said axis; and an enclosed duct integral with said open gutter and formed to extend along substantially the entire length of the bottom edge of the window; said duct opening at its front end to the gutter at a position forwardly of said pivotal axis and near the forward edge of the window, and opening at its rear end near the trailing edge of the window.

8. A drainage member as set forth in claim 7, in which said open gutter is formed to extend along substantially the entire length of the bottom edge of the window.

ROBERT H. STANTON.

References Cited in the file of this patent

UNITED STATES PATENTS

| Number | Name | Date |
|---|---|---|
| 2,029,978 | Andrews | Feb. 4, 1936 |
| 2,119,635 | Griffith | June 7, 1938 |
| 2,354,443 | Schirra | July 25, 1944 |
| 2,451,399 | Martin | Oct. 12, 1948 |